United States Patent
Xu et al.

(10) Patent No.: US 11,991,377 B2
(45) Date of Patent: May 21, 2024

(54) METHOD AND APPARATUS FOR VIDEO CODING

(71) Applicant: Tencent America LLC, Palo Alto, CA (US)

(72) Inventors: Xiaozhong Xu, State College, PA (US); Xiang Li, Los Gatos, CA (US); Shan Liu, San Jose, CA (US)

(73) Assignee: TENCENT AMERICA LLC, Palo Alto, CA (US)

(*) Notice: Subject to any disclaimer, the term of this patent is extended or adjusted under 35 U.S.C. 154(b) by 139 days.

(21) Appl. No.: 17/409,947

(22) Filed: Aug. 24, 2021

(65) Prior Publication Data

US 2021/0385475 A1    Dec. 9, 2021

Related U.S. Application Data

(63) Continuation of application No. 16/536,301, filed on Aug. 8, 2019, now Pat. No. 11,140,404.

(Continued)

(51) Int. Cl.
*H04N 19/44* (2014.01)
*H04N 19/132* (2014.01)
(Continued)

(52) U.S. Cl.
CPC .......... *H04N 19/44* (2014.11); *H04N 19/132* (2014.11); *H04N 19/159* (2014.11);
(Continued)

(58) Field of Classification Search
CPC .................................................. H04N 19/186
See application file for complete search history.

(56) References Cited

U.S. PATENT DOCUMENTS

| | | |
|---|---|---|
| 2015/0043641 A1 | 2/2015 | Gamei |
| 2015/0195559 A1* | 7/2015 | Chen .................... H04N 19/513 375/240.16 |

(Continued)

OTHER PUBLICATIONS

Joint Collaborative Team on Video Coding (JCT-VC) of ITU-T SG 16 WP 3 and ISO/IEC JTC 1/SC 29/WG 11 13th Meeting: Incheon, KR, Apr. 18-26, 2013 (Document: JCTVC-N1005_v1) (Year: 2013).*

(Continued)

*Primary Examiner* — Clifford Hilaire
(74) *Attorney, Agent, or Firm* — ARENTFOX SCHIFF LLP

(57) ABSTRACT

Aspects of the disclosure provide a method and an apparatus including processing circuitry for video decoding. The processing circuitry can decode prediction information of a chroma coding block (CB) from a coded video bitstream. The prediction information indicates an intra block copy (IBC) mode for the chroma CB and the chroma CB includes one or more chroma units. The processing circuitry can determine a chroma block vector (BV) for one of the one or more chroma units based on at least one luma unit collocated with the one of the one or more chroma units. The at least one luma unit is coded in the IBC mode. The processing circuitry can reconstruct at least one sample in the one of the one or more chroma units based on the chroma BV. The at least one luma unit and the chroma CB can be associated with separate luma-chroma coding trees.

17 Claims, 15 Drawing Sheets

Related U.S. Application Data

(60) Provisional application No. 62/744,467, filed on Oct. 11, 2018.

(51) Int. Cl.
    *H04N 19/159*     (2014.01)
    *H04N 19/176*     (2014.01)
    *H04N 19/186*     (2014.01)
    *H04N 19/96*     (2014.01)

(52) U.S. Cl.
    CPC ......... *H04N 19/176* (2014.11); *H04N 19/186* (2014.11); *H04N 19/96* (2014.11)

(56) References Cited

U.S. PATENT DOCUMENTS

| | | |
|---|---|---|
| 2016/0219298 A1 | 7/2016 | Li |
| 2016/0330474 A1 | 11/2016 | Liu et al. |
| 2017/0054996 A1 | 2/2017 | Xu et al. |
| 2017/0094271 A1 | 3/2017 | Liu et al. |
| 2017/0195677 A1 | 7/2017 | Ye et al. |
| 2017/0280159 A1 | 9/2017 | Xu et al. |
| 2017/0295370 A1 | 10/2017 | Xu et al. |
| 2017/0310961 A1 | 10/2017 | Liu et al. |
| 2018/0288446 A1 | 10/2018 | An |
| 2019/0246143 A1 | 8/2019 | Zhang |

OTHER PUBLICATIONS

Chinese Office Action issued Jan. 6, 2022 in Application No. 201910958155.9 with English Translation.
Xiaozhong Xu, Xiang Li and Shan Liu, "Intra Block Copy for Next Generation Video Coding," 2018 IEEE International Conference on Multimedia & Expo Workshops (ICMEW), 2018, pp. 1-4, doi: 10.1109/ICMEW.2018.8551528.
Xiang Li et al., "Description of SDR video coding technology proposal by Tencent". Doc. JVET-J0029. San Diego, CA, USA, 10th meeting: Joint Video Experts Team (JVET) of ITU-T SG 16 WP 3 and ISO/IEC JTC 1/SC 29/WG 11, Apr. 10, 2018. 34 pages.
[1] X. Xu, S. Liu, T. Chuang, Y. Huang, S. Lei, K. Rapaka, C. Pang, V. Seregin, Y. Wang, and M. Karczewicz, "Intra Block Copy in HEVC Screen Content Coding Extensions," IEEE J. Emerg. Sel. Topics Circuits Syst., vol. 6, No. 4, pp. 409-419, 2016.
[2] S. Liu, X. Xu, S. Lei and K. Jou, "Overview of HEVC extensions on screen content coding", APSIPA Transactions on Signal and Information Processing, SIP (2015), vol. 4, e10, p. 1 of 12.
[3] R. Joshi, S. Liu, G. Sullivan, YK Wang, J. Xu, Y. Ye, "HEVC Screen Content Coding Draft Text 6", JCTVC-W1005, Proceeding of 23rd JCT-VC meeting, San Diego, CA, USA, Feb. 2016.
[4] P. Lai, X. Xu, S. Liu, T.-D. Chuang, S. Lei (MediaTek), "AHG14: Intra Block Copy reference area for Wavefront Parallel Processing (WPP)", JCTVC-S0101, Proceeding of the 19th JCT-VC meeting, Strasbourg, France, Oct. 2014.
[6] X. Xu, S. Liu, T.-D. Chuang and S. Lei, "Block Vector Prediction in Intra Block Copy for HEVC Screen Content Coding", Data Compression Conference (DCC), Apr. 2015.
[9] X. Xu, T.-D. Chuang, S. Liu, S. Lei, "Non-CE2: Intra BC merge mode with default candidates", JCTVC-S0123, Proceeding of the 19th JCT-VC meeting, Strasbourg, France, Oct. 2014.
[10] Y. Sun, S. Hsiang, J. Kim, Y. Chen, X. Xu, W. Zhu and S. Lei, "Improvements of HEVC SCC Palette Mode and Intra Block Copy", IEEE J. Emerg. Sel. Topics Circuits Syst., vol. 6, No. 4, pp. 433-445, 2016.
[13] X. Xu, S. Liu and S. Lei, "On chroma motion vector derivation for intra block copy", JCTVC-U0077, Proceeding of the 19th JCT-VC meeting, Wawsaw, Poland, Jun. 2015.
[16] X. Xu, S. Liu, S. Lei, "On Reference Picture List Construction for Intra Block Copy", JCTVC-U0113, Proceeding of the 19th JCT-VC meeting, Wawsaw, Poland, Jun. 2015.
[17] X. Xu, S. Liu, C. Liu, S. Lei, Y.-K. Wang, K. Rapaka, V. Seregin, "On Storage of Filtered and Unfiltered Current Decoded Pictures", JCTVC-U0181, Proceeding of the 19th JCT-VC meeting, Wawsaw, Poland, Jun. 2015.
[18] X. Xu, S. Liu, S. Lei, "On intra block copy signalling and constraints", JCTVC-V0056, Proceeding of the 22nd JCT-VC meeting, Geneva, Switzerland, Oct. 2015.
[19] X. Xu, S. Liu, S. Lei, "DPB considerations when current picture is a reference picture", JCTVC-V0057, Proceeding of the 22nd JCT-VC meeting, Geneva, Switzerland, Oct. 2015.
[20] X. Xu, S. Liu, S. Lei, "Bug fix for DPB operations when current picture is a reference picture", JCTVC-W0077, Proceeding of the 23rd JCT-VC meeting, San Diego, CA, USA, Feb. 2016.
[22] C.-C. Chen and W.-H. Peng, "Intra Line Copy for HEVC Screen Content Intra-Picture Prediction", IEEE Transactions on Circuits and Systems for Video Technology, vol. 27, Issue: 7, pp. 1568-1579, Jul. 2017.
[23] Jianle Chen, et al, "Algorithm Description of Joint Exploration Test Model 7 (JEM 7)", JVET-G1001, Joint Video Exploration Team (JVET) of ITU-T SG 16 WP 3 and ISO/IEC JTC 1/SC 29/WG 117th Meeting: Torino, IT, Jul. 13-21, 2017.
[24] S. Shen, F. Liang and K. Luo, "Deformable motion model for Frame Rate Up-Conversion in video coding", 2016 IEEE Region 10 Conference (TENCON), Nov. 2016.
[25] S. Kamp and M. Wien, "Decoder-Side Motion Vector Derivation for Block-Based Video Coding", IEEE Transactions on Circuits and Systems for Video Technology, vol. 22, Issue: 12, pp. 1732-1745, Dec. 2012).
[26] High Efficiency Video Coding (HEVC), Rec. ITU-T H.265 v4, Dec. 2016.
[27] G. Venugopal, H. Schwarz, D. Marpe and T. Wiegand, ""Intra Region-based Template Matching"", JVET-J0039, JVET-J1002, 10th JVET meeting, Apr. 2018.
[28] "HEVC Screen Content Coding Draft Text 5", ITU-T/ISO/IEC, JCTVC-T1005, 2015.
[29] "Screen content coding test model 5 (SCM 5)", Joint Collaborative Team on Video Coding (JCTVC) meeting, JCTVC-U1014, 2015.
[30] Xiaozhong Xu, et al, "Description of Core Experiment 8 (CE8): Current Picture Referencing", JVET-K1028, 11th JVET meeting, Jul. 2018.
[31] J. An, H. Huang, K. Zhang. Quadtree plus binary tree structure integration with JEM tools, JVET-B0023, Joint Video Exploration Team (JVET). Feb. 2016.
[32] H. Yang, S. Liu, K. Zhang, "Description of Core Experiment 4 (CE4): Inter prediction and motion vector coding", ISO/IEC JTC1/SC29/WG11 JVET-J1024, Jul. 2018.
[33] Kai Zhang, etc., "CE4: Affine Prediction with 4×4 Sub-blocks for Chroma Components (Test 4.1.16)", JVET-L0265, Oct. 2018.

\* cited by examiner

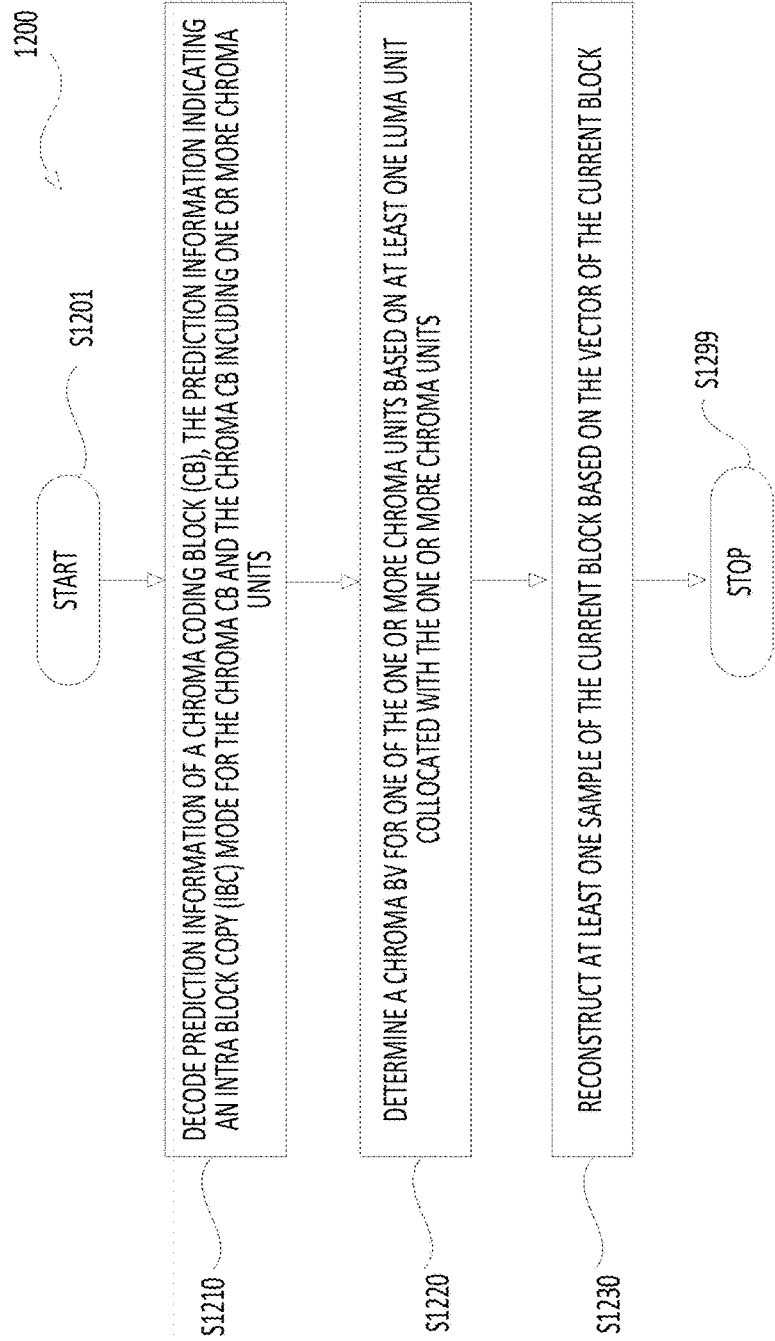

METHOD AND APPARATUS FOR VIDEO CODING

CROSS-REFERENCE TO RELATED APPLICATIONS

This application is a continuation of and claims the benefit of priority under 35 U.S.C. § 120 from U.S. application Ser. No. 16/536,301 filed Aug. 8, 2019, which claims the benefit of priority from U.S. Provisional Application No. 62/744,467 filed Oct. 11, 2018, the entire contents of each of which are incorporated herein by reference.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding/decoding of spatially neighboring, and preceding in decoding order, blocks of data. Such techniques are henceforth called "intra prediction" techniques. Note that in at least some cases, intra prediction is only using reference data from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode/submode/parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101A) represents the sample being predicted. The arrows represent the direction from which the sample is being predicted. For example, arrow (102A) indicates that sample (101A) is predicted from a sample or samples to the upper right, at a 45 degree angle from the horizontal. Similarly, arrow (103A) indicates that sample (101A) is predicted from a sample or samples to the lower left of sample (101A), in a 22.5 degree angle from the horizontal.

Still referring to FIG. 1A, on the top left there is depicted a square block (104A) of 4×4 samples (indicated by a dashed, boldface line). The square block (104A) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104A) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104A). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102A)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (101B) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video decoding includes processing circuitry. The processing circuitry can decode prediction information of a chroma coding block (CB) from a coded video bitstream. The prediction information indicates an intra block copy (IBC) mode for the chroma CB and the chroma CB includes one or more chroma units. The processing circuitry can determine a chroma block vector (BV) for one of the one or more chroma units based on at least one luma unit collocated with the one of the one or more chroma units. The at least one luma unit is coded in the IBC mode. The processing circuitry can reconstruct at least one sample in the one of the one or more chroma units based on the chroma BV.

In an embodiment, the at least one luma unit and the chroma CB are associated with separate luma-chroma coding trees.

In an embodiment, the at least one luma unit includes a plurality of luma units collocated with the one of the one or more chroma units. The processing circuitry can determine the chroma BV based on one or more luma BVs for the plurality of luma units. In an example, the processing circuitry can determine a luma sample location in one of the plurality of luma units based on one of: a top left sample, a bottom right sample, a center sample, and a pre-defined sample of the one of the one or more chroma units. The processing circuitry can also determine that the one or more luma BVs is a luma BV for the one of the plurality of luma units and determine the chroma BV based on the luma BV. In an example, the one or more luma BVs for the plurality of luma units includes a plurality of luma BVs for the plurality of luma units and the processing circuitry determines the chroma BV based on an average of the plurality of luma BVs.

In an embodiment, the at least one luma unit is a single luma unit collocated with the one of the one or more chroma units and the processing circuitry determines the chroma BV based on a luma BV for the single luma unit.

In an embodiment, the processing circuitry can set a chroma unit size for the one or more chroma units and a luma unit size for the at least one luma unit based on sizes of a luma unit and a chroma unit used for one of: a sub-block based motion vector prediction mode and a block based motion vector prediction mode. In an example, the at least one luma unit and the chroma CB are associated with separate luma-chroma coding trees, and the processing circuitry sets the chroma unit size and the luma unit size based on the sizes of the luma unit and the chroma unit used for the sub-block based motion vector prediction mode. In an example, the separate luma-chroma coding trees are disabled, and the processing circuitry sets the chroma unit size and the luma unit size based on the sizes of the luma unit and the chroma unit used for the block based motion vector prediction mode.

In an embodiment, the chroma CB is collocated with a luma region. Each of the one or more chroma units in the chroma CB is collocated with one or more luma units in the luma region. For each of the one or more chroma units in the chroma CB, the respective one or more luma units is coded in the IBC mode and is available to determine a chroma BV for each of the one or more chroma units.

Aspects of the disclosure also provide a non-transitory computer-readable medium storing instructions which when executed by a computer for video decoding cause the computer to perform the method for video decoding.

BRIEF DESCRIPTION OF THE DRAWINGS

Further features, the nature, and various advantages of the disclosed subject matter will be more apparent from the following detailed description and the accompanying drawings in which:

FIG. 12 shows a flow chart outlining a process according to an embodiment of the disclosure.

DETAILED DESCRIPTION OF EMBODIMENTS

Figure 1A:
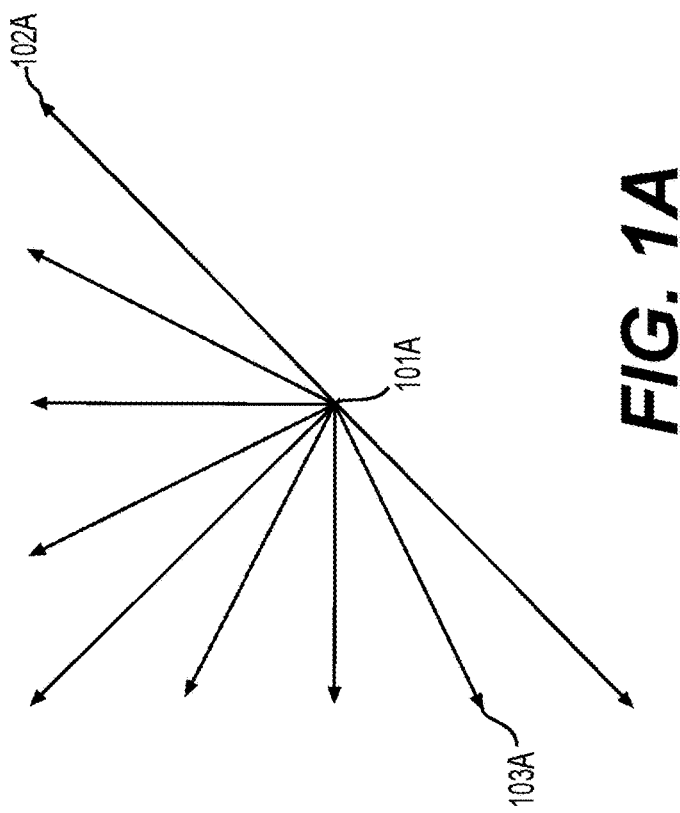
FIG. 1A is a schematic illustration of an exemplary subset of intra prediction modes.
Figure 1B:
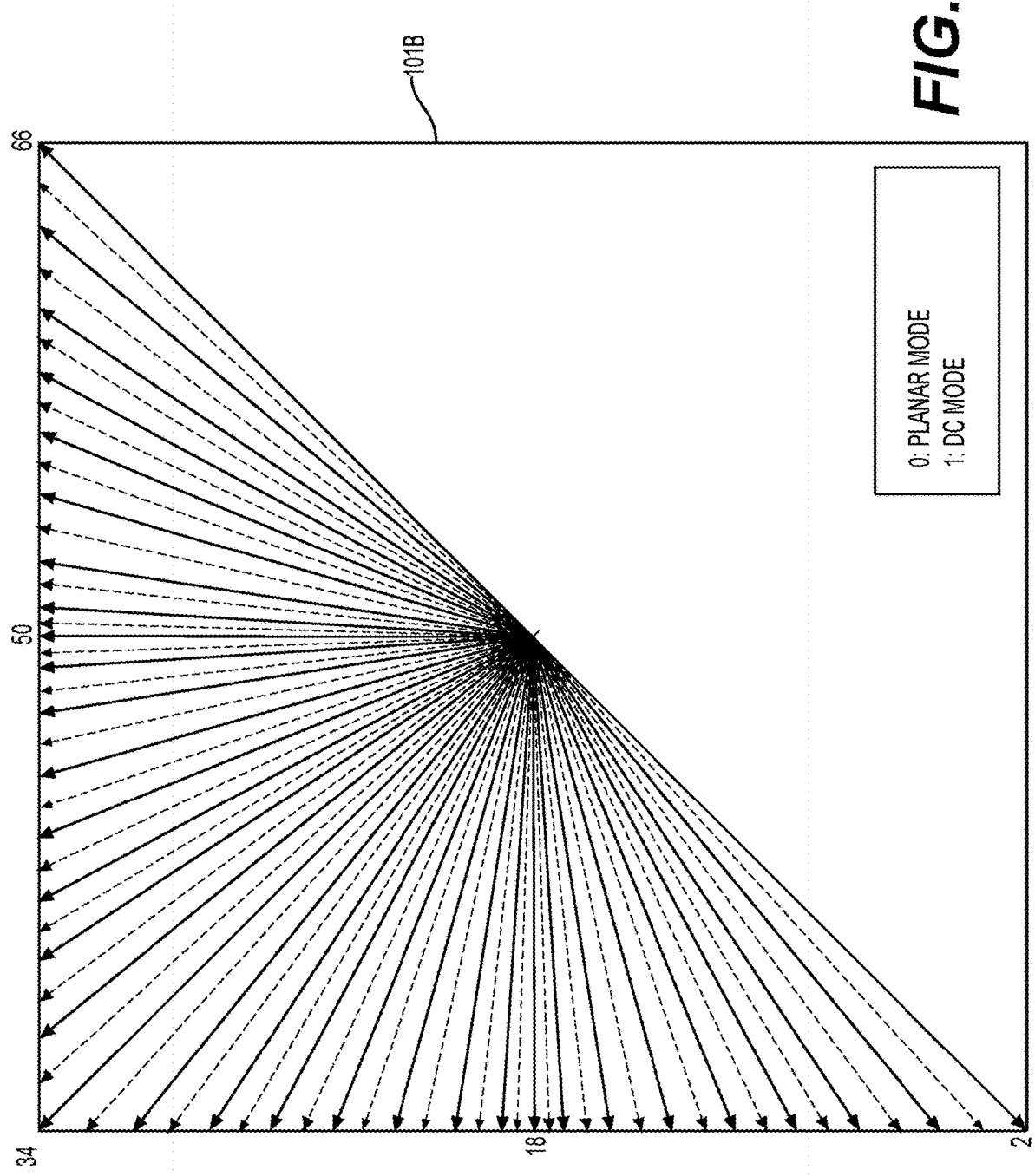
FIG. 1B is an illustration of exemplary intra prediction directions.
Figure 2:
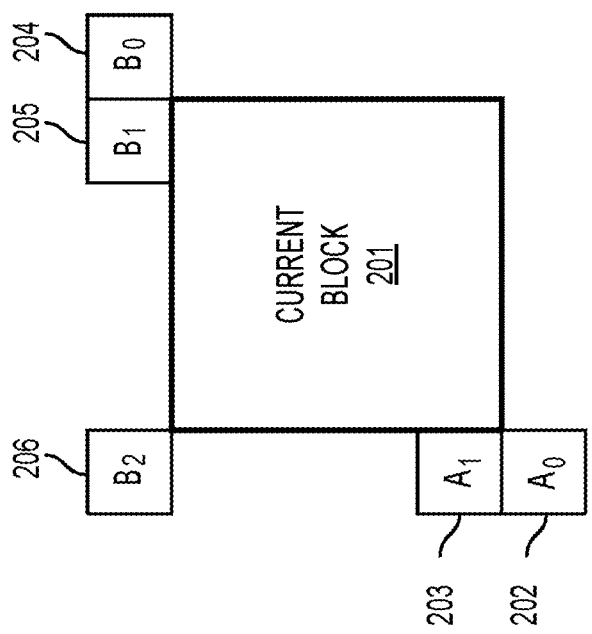
FIG. 2 is a schematic illustration of a current block and its surrounding spatial merge candidates in one example.
Figure 3:
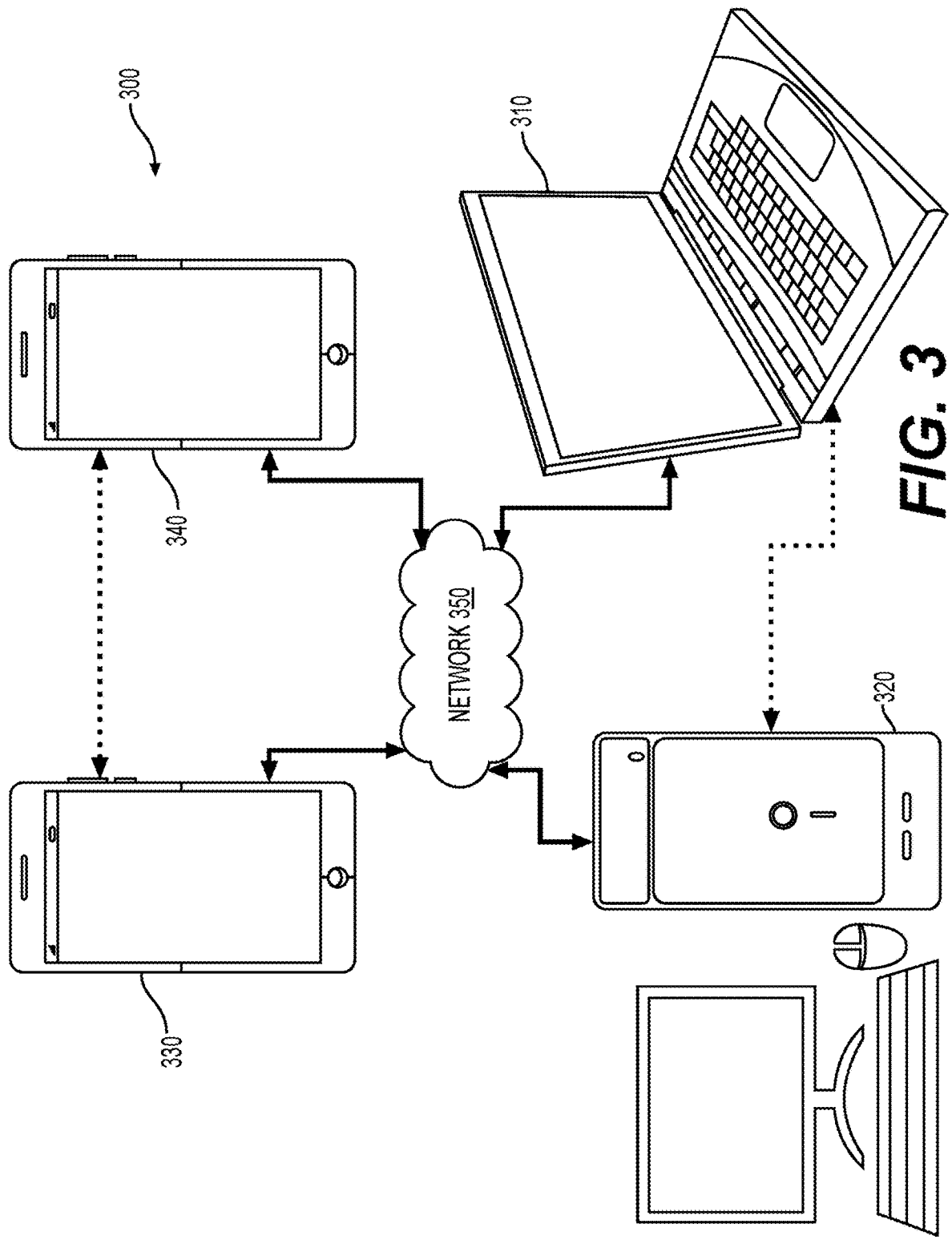
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
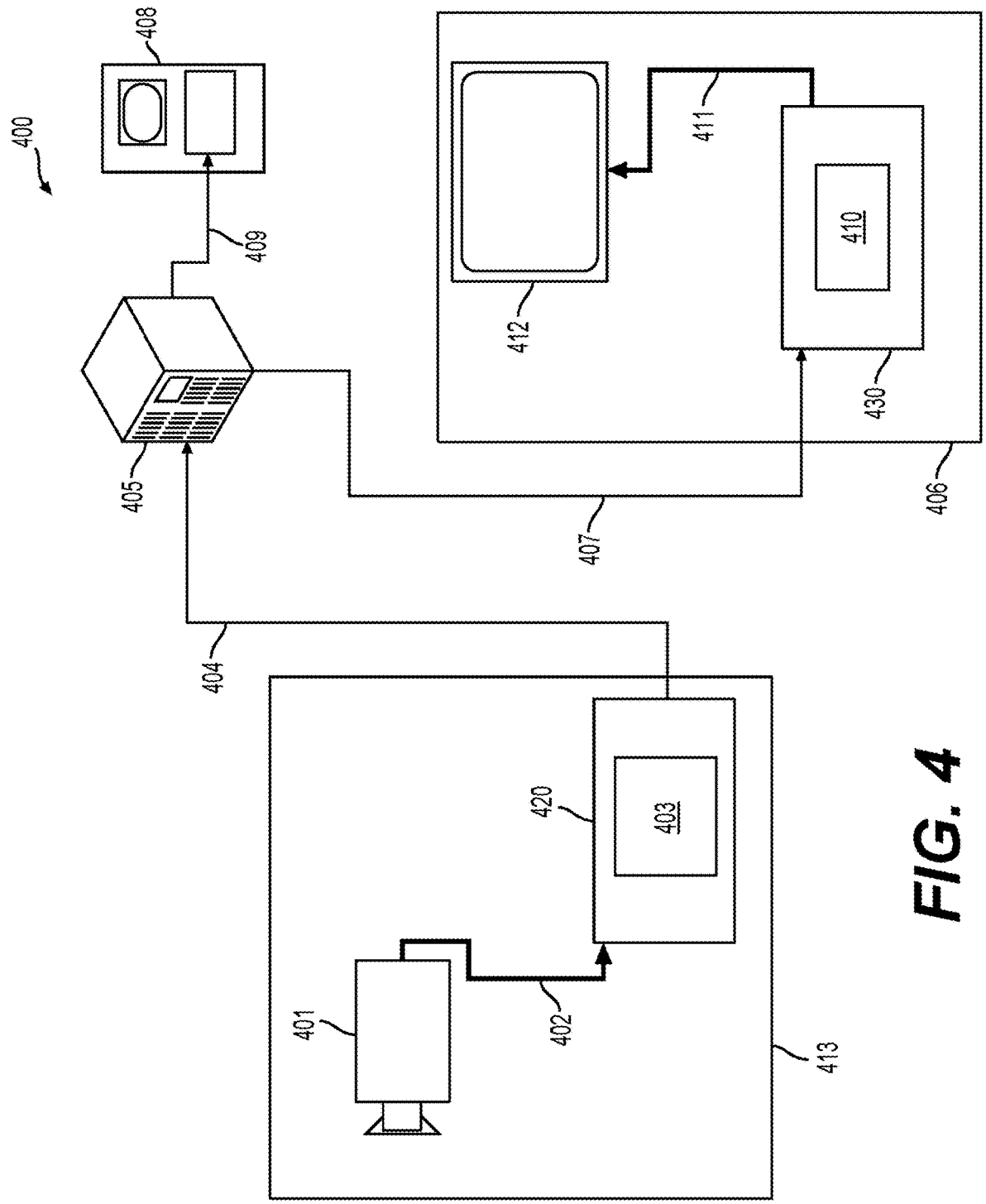
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
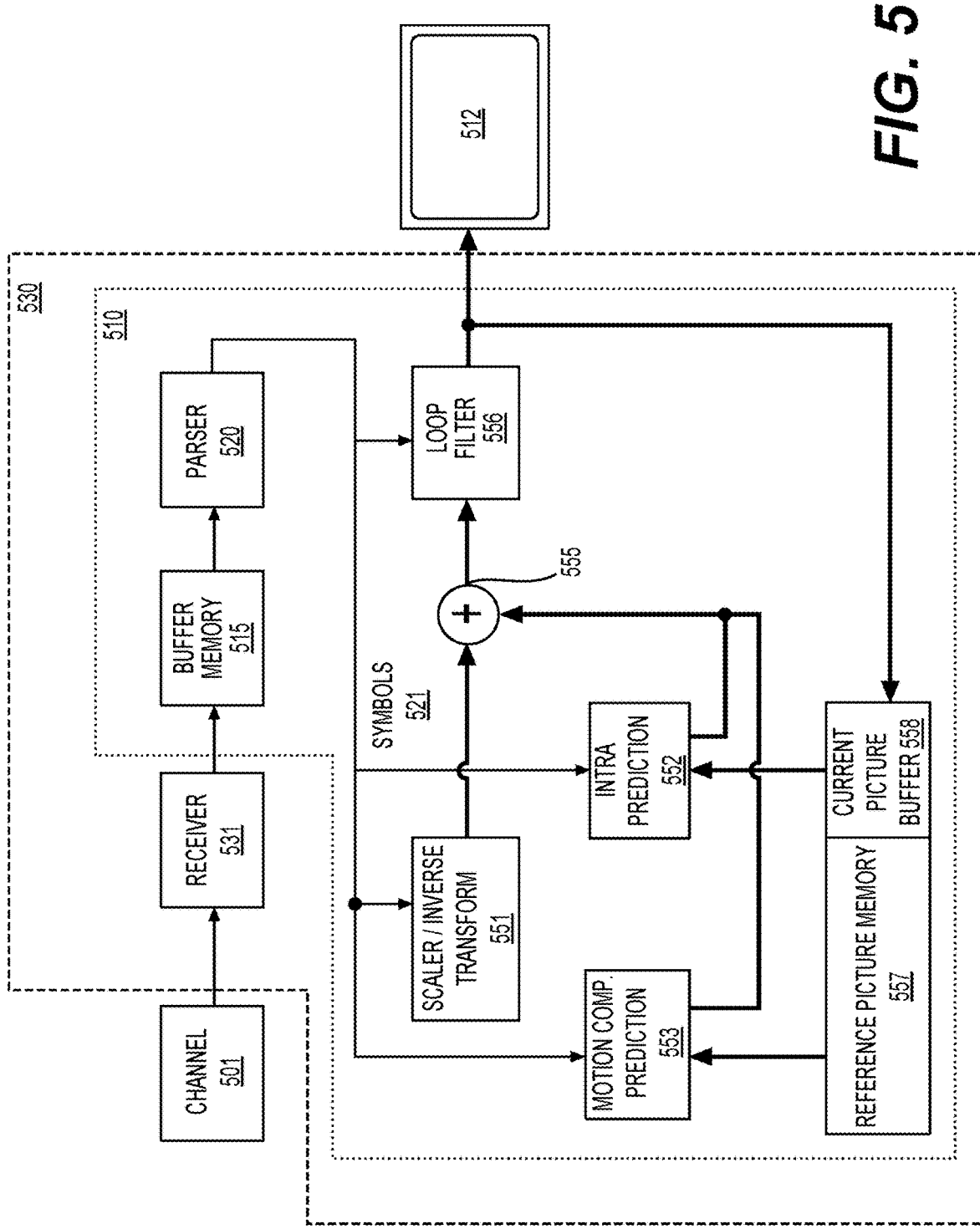
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
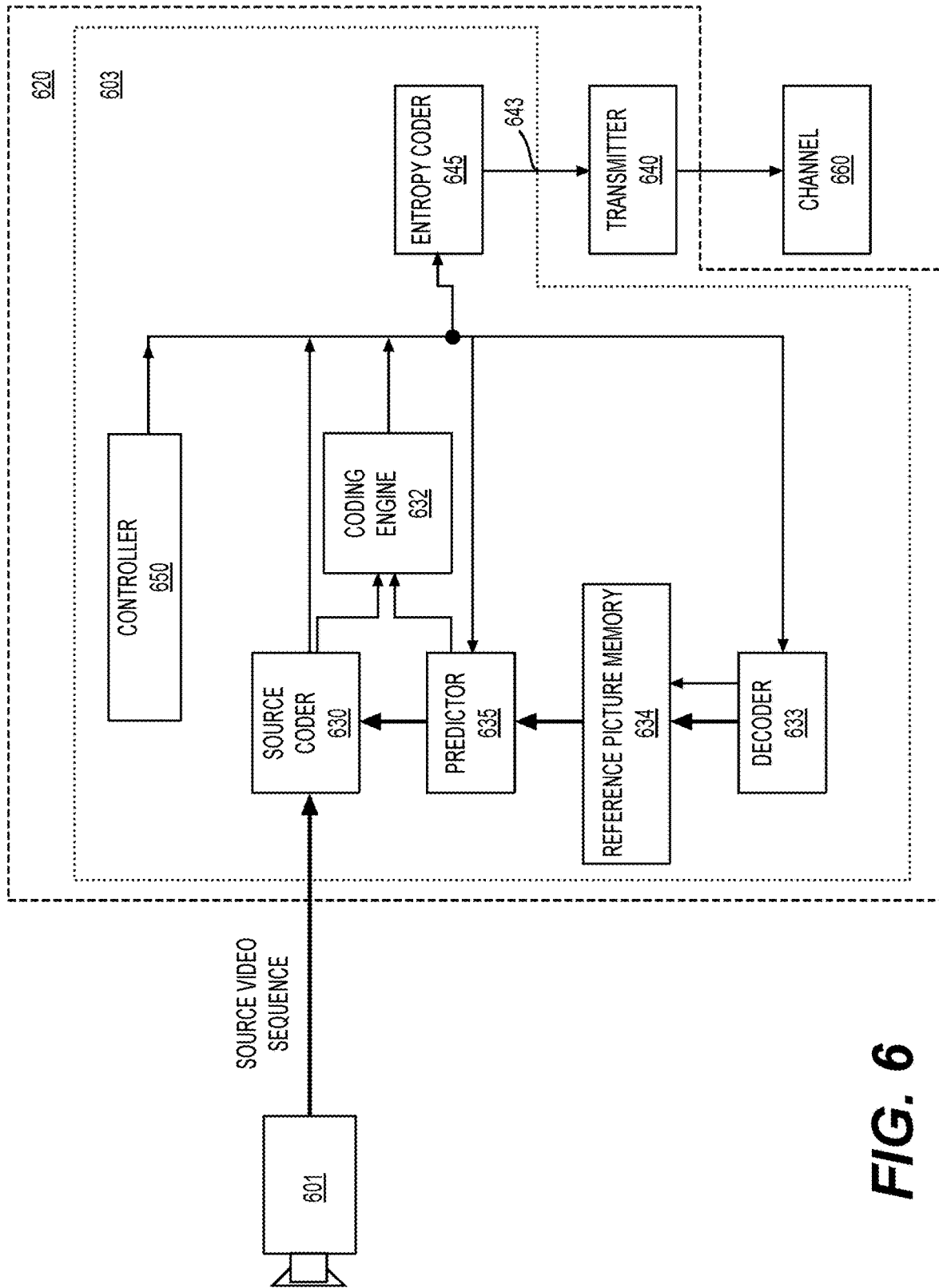
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (630) may perform motion compensated predictive coding, which codes an input picture predictively with reference to one or more previously-coded picture from the video sequence that were designated as "reference pictures". In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
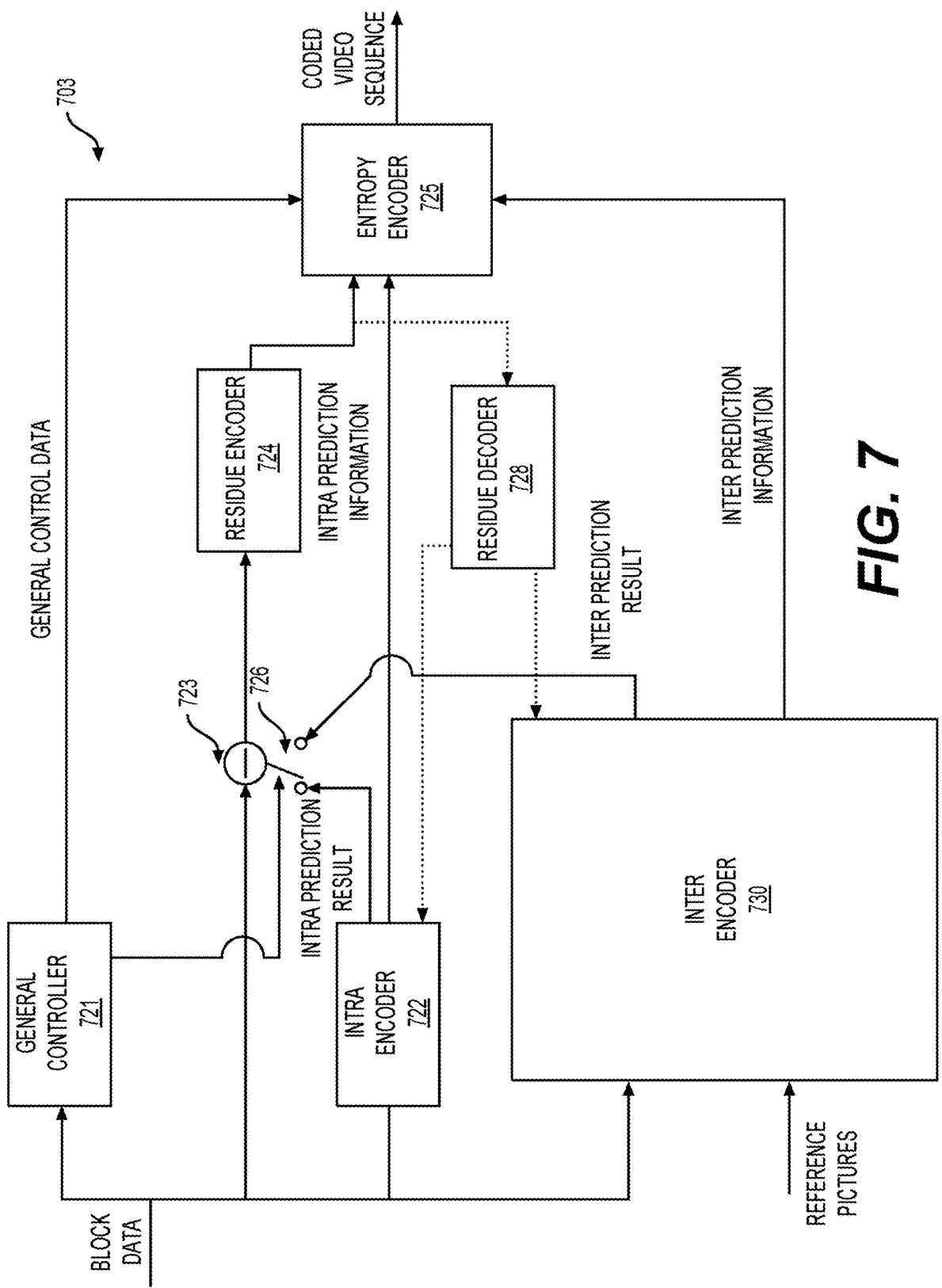
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
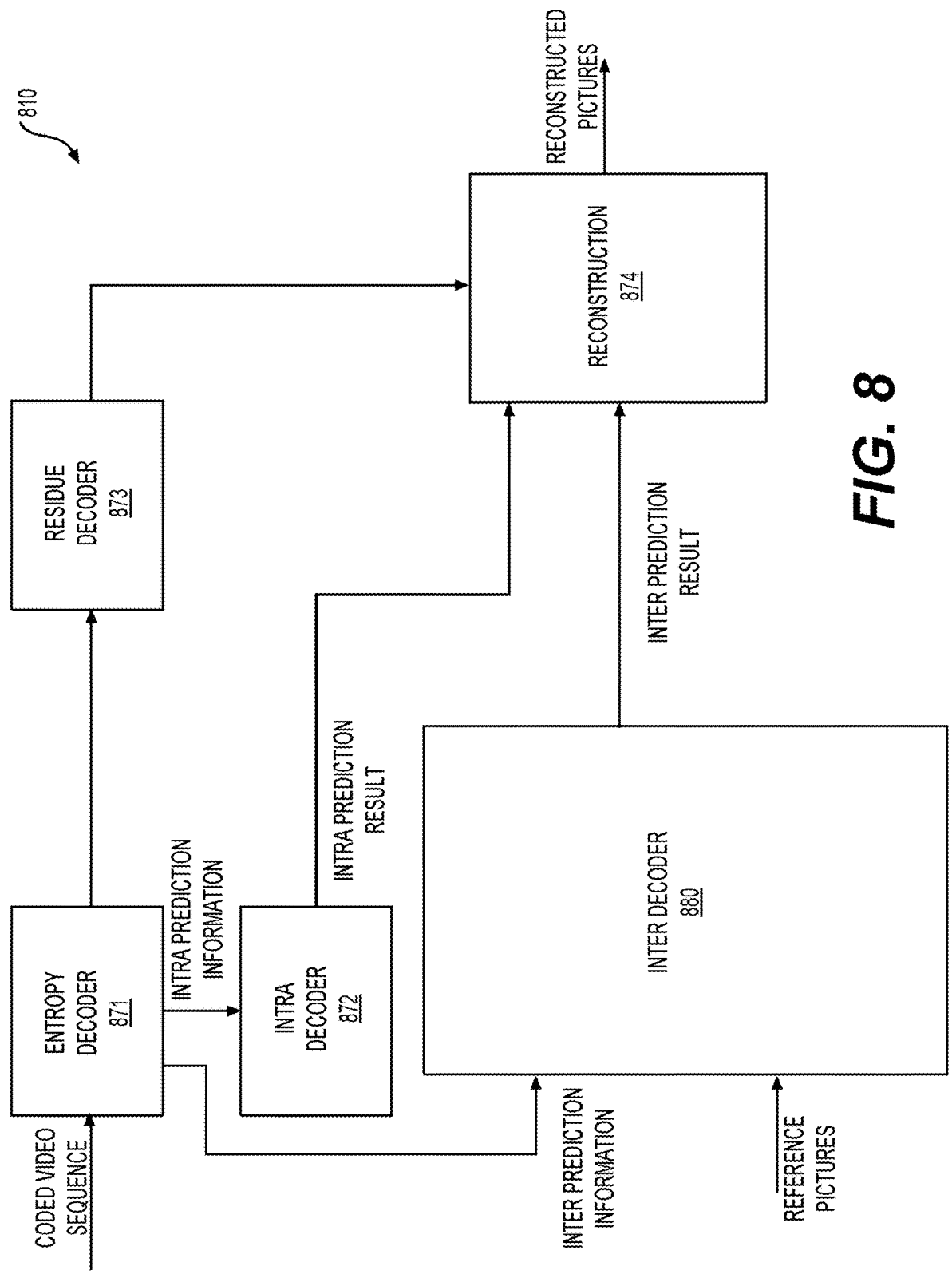
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Aspects of the disclosure provide techniques that can determine one or more block vectors for a chroma coding block based on at least one block vector for a luma region that is collocated with the chroma coding block.

Block based compensation can be used for inter prediction and intra prediction. For the inter prediction, block based compensation from a different picture is known as motion compensation. Block based compensation can also be performed from a previously reconstructed area within the same picture, such as in intra prediction. The block based compensation from the reconstructed area within the same picture can be referred to as intra picture block compensation, current picture referencing (CPR), or intra block copy (IBC). A displacement vector that indicates an offset between a current block and a reference block (also referred to as a prediction block) in the same picture is referred to as a block vector (BV) where the current block can be encoded/decoded based on the reference block. Different from a motion vector in motion compensation, which can have any value (positive or negative, at either x or y direction), a BV can have constraints to ensure that the reference block is available and already reconstructed. Also, for parallel processing considerations, a reference area in some examples such as a tile boundary, slice boundary, or wavefront ladder shape boundary can be excluded.

The coding of a BV can be either explicit or implicit. In the explicit mode, a BV difference between a BV and a BV predictor is signaled, which is similar to advanced motion vector prediction (AMVP) in the inter prediction. In the implicit mode, a BV can be recovered from a BV predictor without using a BV difference, in a similar way as a motion vector in a merge mode. In some examples, a resolution of a BV is restricted to an integer resolution and the BV can only point to integer positions. In some examples, a BV can have a fractional resolution and the BV can point to a fractional position.

The use of intra block copy at a block level can be signaled using a block level flag, such as an IBC flag. In an embodiment, the block level flag is signaled when the current block is not coded in merge mode. The use of intra block copy at a block level can be signaled using a reference index approach. The current picture under decoding is then treated as a reference picture or a special reference picture. In an example, such a reference picture is placed in the last position of a list of reference pictures. The special reference picture can also be managed together with other temporal reference pictures in a buffer, such as a decoded picture buffer (DPB).

While an embodiment of intra block copy is used as an example in the present disclosure, the embodiments of the present disclosure can be applied to variations of intra block copy. The variations of intra block copy include, for example, flipped intra block copy where the reference block is flipped horizontally or vertically before being used to predict a current block, or line based intra block copy where each compensation unit inside an M×N coding block is an M×1 or 1×N line.

Figure 9:
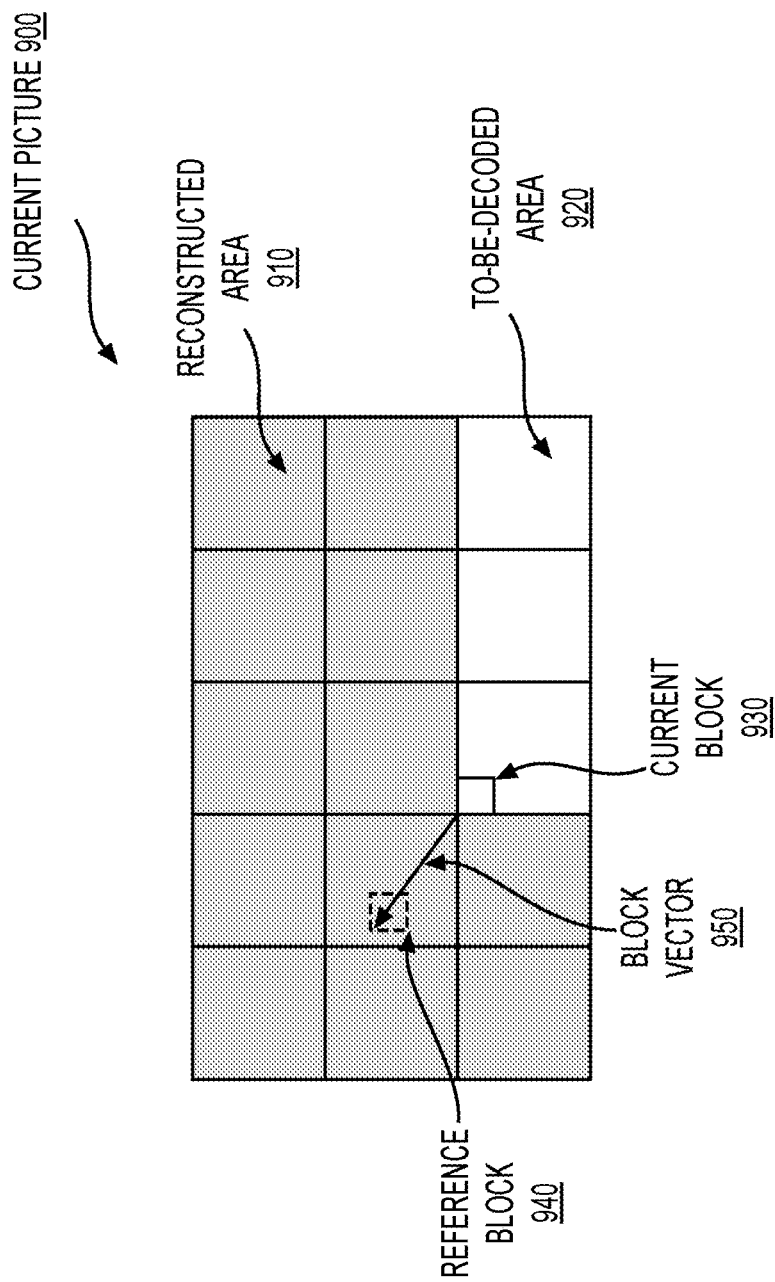
FIG. 9 shows an example of intra block copy according to an embodiment of the disclosure.

FIG. 9 shows an example of intra block copy according to an embodiment of the disclosure. A current picture (900) is to be reconstructed during decoding. The current picture (900) includes a reconstructed area (910) (grey area) and a to-be-decoded area (920) (white area). A current block (930) is under reconstruction by a decoder. The current block (930) can be reconstructed from a reference block (940) that is in the reconstructed area (910). A position offset between the reference block (940) and the current block (930) is referred to as a BV (950).

In some examples, reconstructed samples of the current picture are stored in a memory, for example a dedicated memory. To reduce implementation cost, the reference area is smaller than the current picture, and in some cases can be limited by a memory size. In an example, the reference block can be located only in a portion of the current picture, such as the reference area, as not all locations in the current picture contain a reference block. For example, when the memory size is one CTU, use of the IBC mode can be limited to only when the reference block is within the same CTU as the current block. When the memory size is two CTUs, use of the IBC mode can be limited to when the reference block is either within the current CTU or a previous CTU (e.g., a CTU to the left of the current CTU). When a block referred to by the BV is outside the reference area, even if the block is reconstructed and is located in a reconstructed area in the current picture, samples in the block may not be useable for the IBC compensation due to memory size constraints, and thus the block cannot be used as a reference block.

A coding unit can include samples of both luma and chroma components. The samples of the chroma component can have an independent or separate split tree (also referred to as coding tree) structure as compared to the samples of luma component. Such a separate coding tree structure can start from a CTU level. Therefore, a chroma CU can be larger than the luma counterpart at the corresponding sample location. A chroma CU can include only two chroma components, or two chroma CBs, for example.

Sub-block based motion vector prediction methods or mode can include affine motion compensation, alternative temporal motion vector prediction (ATMVP) mode, MV planar mode, or the like. In a sub-block motion vector prediction mode, different motion vectors can be used for the smallest block units (also referred to as sub-blocks) inside a coding block. For example, an 8×8 coding block is coded using affine motion compensation. Each 4×4 luma block unit (and a corresponding 2×2 chroma block unit) in the 8×8 coding block can have different motion vectors, where the 4×4 luma block unit and the 2×2 chroma block unit can be referred to as the smallest block units for luma and chroma components, respectively, or the smallest luma block unit and the smallest chroma block unit. In an example, such as in a 4:2:0 format, a smallest chroma block unit in a sub-block based motion vector prediction mode can be constrained to be 4×4, and thus the smallest chroma block unit is collocated with four corresponding luma (4×4) smallest block units. Accordingly, a motion vector for the 4×4 smallest chroma block unit can be determined by averaging motion vectors from the four corresponding luma smallest block units.

Block based motion compensation for all color components of a block can share a same motion vector or a block vector. However, when separate luma and chroma coding trees (also referred to as luma-chroma separate coding trees) are used or otherwise enabled, the luma-chroma sample correspondence at the same location may not be always associated with each other (e.g., have a one-to-one correspondence). For example, in some cases, a luma CU area may cover more than one chroma CU. In other cases, a chroma CU area may cover more than one luma CU. Embodiments of the present application can be used to improve efficiency of the IBC mode in various scenarios, such as when separate luma and chroma coding trees are enabled or disabled.

According to aspects of the disclosure, the IBC mode can be used for coding a chroma CU or a chroma coding block (CB), which can be included in the chroma CU. In an example, when separate luma and chroma coding trees are used, a chroma CU can include two chroma CBs. In an example, when a same coding tree is used for both the luma and chroma components, a CU can include a luma CB and two chroma CBs. The chroma CB can be collocated with a luma region. One or more BVs for the chroma CB can be determined based on at least one BV for the luma region. The chroma CB can include one or more smallest chroma block units (also referred to as chroma units). Samples in the chroma unit can be coded using a same BV for the chroma unit. Samples in two different chroma units in the chroma CB can be coded using different BVs for the two different chroma units, respectively. The luma region can include one or more smallest luma block units (also referred to as luma units). Samples in the luma unit can be coded using a same BV for the luma unit. Samples in two different luma units can be coded using different BVs for the two different luma units, respectively. For purposes of clarity, a BV for a chroma unit can be referred to as a chroma BV, and a BV for a luma unit can be referred to as a luma BV.

Figure 10:
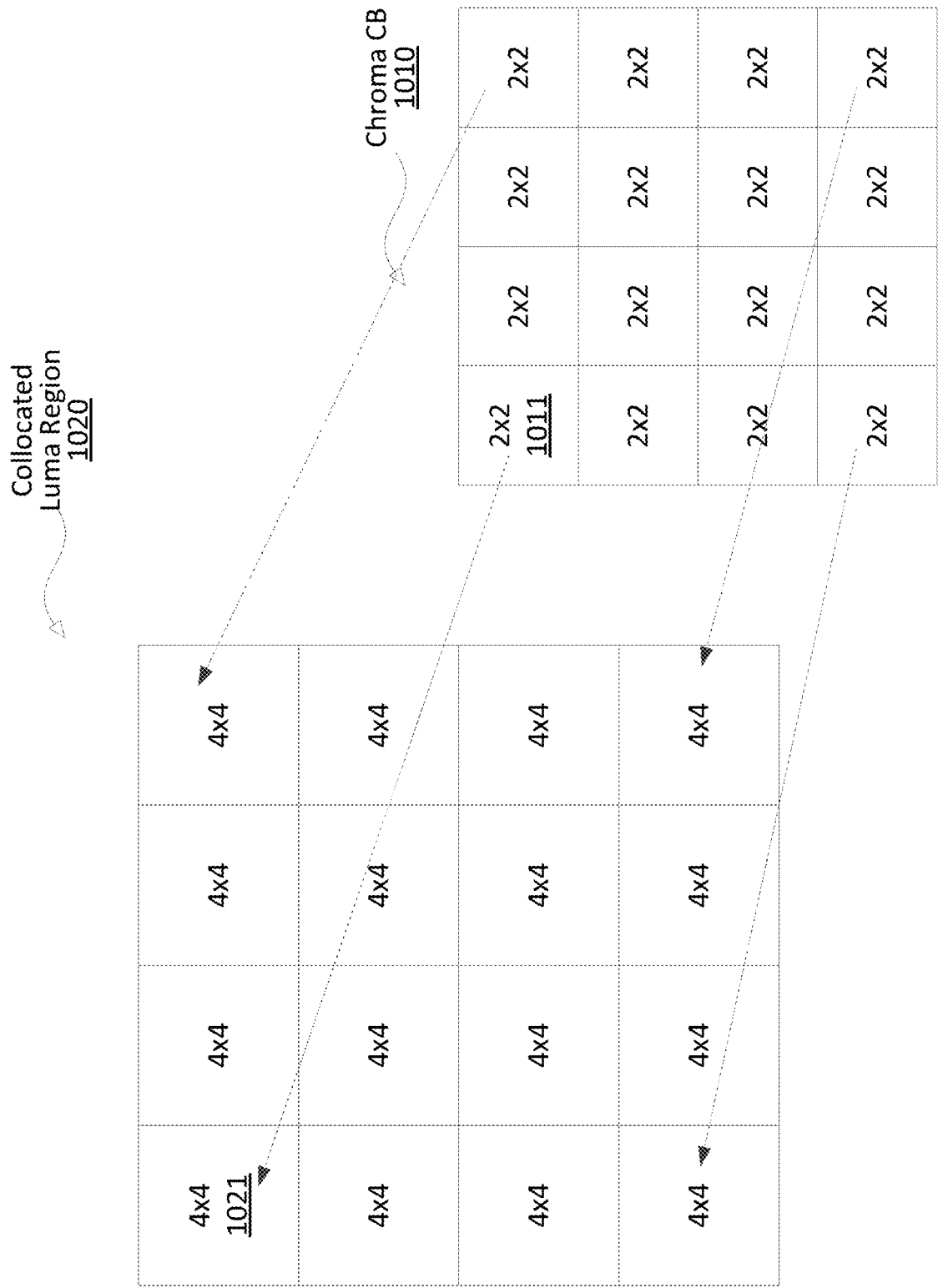
FIG. 10 shows a chroma CB and a collocated luma region according to an embodiment of the disclosure.

In an embodiment, a chroma unit in the chroma CB is collocated with a luma unit in the luma region. A chroma BV of the chroma unit can be determined based on a corresponding luma BV for the luma unit, such as shown in FIG. 10. Embodiments described with reference to FIG. 10 can be performed with or without separate luma and chroma coding trees, for example when luma-chroma separate coding trees are enabled or disabled.

FIG. 10 shows a chroma CB and a collocated luma region according to an embodiment of the disclosure. The chroma CB (1010) includes a plurality of chroma units, such as the chroma unit (1011), and is co-located with the collocated luma region (1020). The collocated luma region (1020) includes a plurality of luma units, such as the luma unit (1021). In the example shown in FIG. 10, a 4:2:0 format is used, each chroma unit has a size of 2×2 chroma samples, each luma unit has a size of 4×4 luma samples, and each chroma unit is collocated with a respective luma unit and covers a same area as that of the luma unit. For example, the chroma unit (1011) is collocated with the luma unit (1021). A chroma BV for each chroma unit can be determined from a corresponding luma BV for the collocated luma unit. In an embodiment, the chroma BV is determined by properly scaling the luma BV. For example, the chroma BV for the chroma unit (1011) is determined based on scaling the luma BV of the luma unit (1021), such as by a factor of 2.

In an embodiment, as a bitstream conformance requirement, when the luma-chroma separate trees are used, the chroma CB (1010) can be coded in the IBC mode when all the derived chroma BVs for the chroma CB (1010) are valid, for example, the chroma BVs point to outside of the entire chroma CB (1010) and a reference area includes one or more samples that is available for intra block copy. In an example, one of the luma units that is collocated with one of the chroma units is not coded in the IBC mode, and thus the one of the luma units does not have a luma BV. Accordingly, the one of the chroma units does not have a luma BV to determine a chroma BV, and the chroma CB cannot be coded in the IBC mode. Signaling of a prediction mode (e.g., an intra prediction mode or the IBC mode) for the chroma CB (1010) may or may not be needed. In an example, the luma-chroma separate trees are used and only an intra prediction mode and the IBC mode can be used. In one example, when the chroma CB (1010) can only be coded in the intra prediction mode because at least one luma unit is not coded in the IBC mode, the prediction mode flag can be inferred to be the intra prediction mode and thus is not signaled. In an example, when the chroma CB (1010) can only be coded in the intra prediction mode because at least one luma unit is not coded in the IBC mode, the prediction mode flag can be signaled with a value indicating the intra prediction mode.

The determined chroma BVs for the chroma units in the chroma CB (1010) can be different, and thus samples in the chroma CB (1010) can be coded with different chroma BVs. The determined chroma BVs can be identical, for example, when the luma BVs are identical. In an example, the luma BVs are different, however, the scaled and/or clipped luma BVs or the determined chroma BVs can be identical, and thus the samples in the chroma CB (1010) can be coded using a same chroma BV. The above description can be applicable with or without separate luma-chroma coding trees.

In an embodiment, for the chroma CB (1010) in FIG. 10 to be coded in the IBC mode when luma-chroma separate coding trees are enabled, the respective luma unit for each chroma unit in the chroma CB (1010) is coded in the IBC mode and a chroma BV for each chroma unit can be derived from the respective luma unit.

FIG. 10 shows an example when the chroma CB (1010) includes a plurality of chroma units. Alternatively, a chroma CB can be a single chroma unit where samples in the chroma CB are coded using a same chroma BV for the chroma CB. The chroma CB can be collocated with a single luma unit, and thus the chroma CB can be determined based on the luma BV for the luma unit.

In an embodiment, a chroma CB is co-located with a luma region, and a chroma unit in the chroma CB is collocated with a plurality of luma units in the luma region. A chroma BV for the chroma unit can be determined based on one or more luma BVs for the plurality of luma units. In an example, the chroma BV is determined based on a luma BV for one of the plurality of luma units. In an example, the chroma BV is determined based on an average of some or all luma BVs for the plurality of luma units. Embodiments described with reference to FIGS. 11A-11B can be performed when luma-chroma separate coding trees are used or disabled.

Figure 11A:
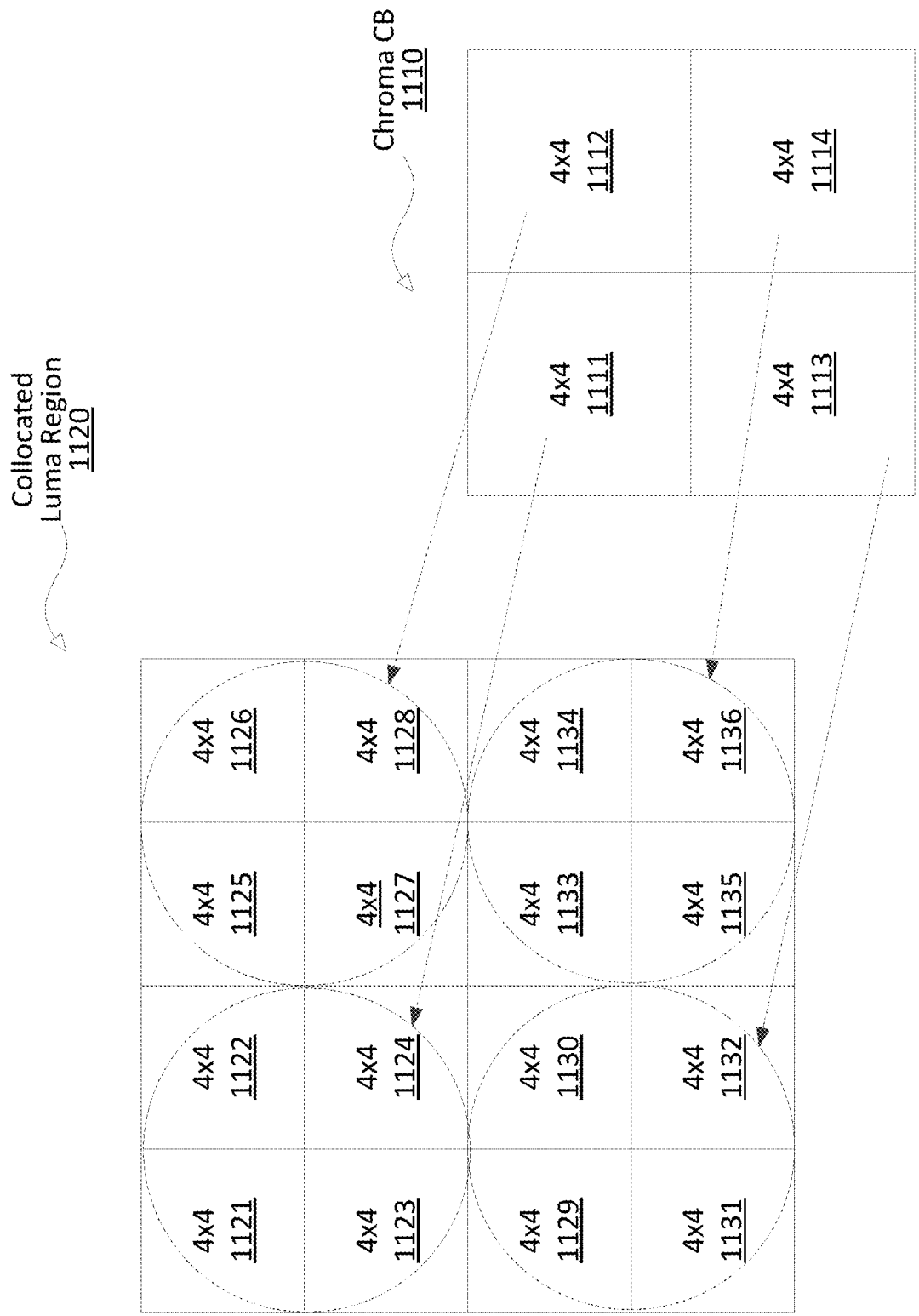
FIG. 11A shows a chroma CB and a collocated luma region according to an embodiment of the disclosure.

FIG. 11A shows a chroma CB and a collocated luma region according to an embodiment of the disclosure. The chroma CB (1110) includes a plurality of chroma units (1111)-(1114), and is co-located with the collocated luma region (1120). The collocated luma region (1120) includes a plurality of luma units (1121)-(1136). In the example shown in FIG. 11A, a 4:2:0 format is used, each chroma unit has a size of 4×4 chroma samples, each luma unit has a size of 4×4 luma samples, and each chroma unit is collocated with four luma units instead of one luma unit shown in FIG. 10. For example, the chroma unit (1111) is collocated with the four luma units (1121)-(1124), the chroma unit (1112) is collocated with the four luma units (1125)-(1128), the chroma unit (1113) is collocated with the four luma units (1129)-(1132), and the chroma unit (1114) is collocated with the four luma units (1133)-(1136). A chroma BV of each chroma unit can be determined as shown in FIG. 11B.

Figure 11B:
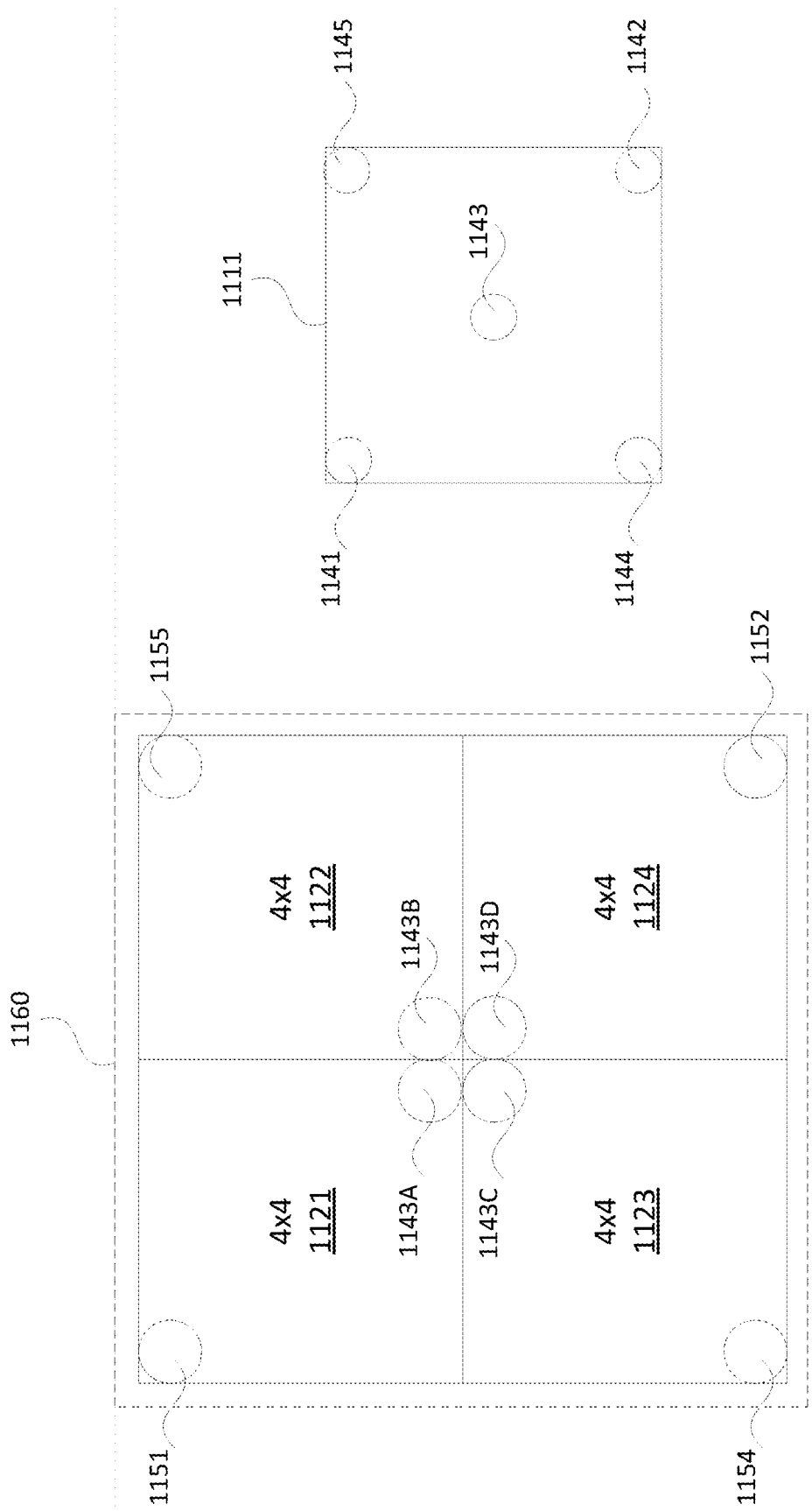
FIG. 11B shows a chroma unit and collocated luma units according to an embodiment of the disclosure.

FIG. 11B shows the chroma unit (1111) and the collocated luma units (1121)-(1124). The chroma BV for the chroma unit (1111) can be determined based on one or more of luma BVs for the luma units (1121)-(1124). Referring to FIG. 11B, the luma units (1121)-(1124) form a luma sub-region (1160) where the luma units (1121)-(1124) are located at a top left, a top right, a bottom left, and a bottom right location of the luma sub-region (1160). Thus, the luma units (1121)-(1124) can be referred to as a top left, a top right, a bottom left, and a bottom right luma unit.

In an embodiment, the chroma BV for the chroma unit (1111) is determined based on one of the luma BVs as follows. A luma sample and a corresponding luma sample location can be determined based on a chroma sample location in the chroma unit (1111). Accordingly, a luma BV for a luma unit where the luma sample is located can be used to determine the chroma BV.

In an example, the chroma sample is a top left sample (1141) of the chroma unit (1111). Accordingly, the corresponding luma sample, e.g., (1151), is located in the top left luma unit (1121). Thus, the luma BV for the luma unit (1121) is used to determine the chroma BV. For example, the chroma BV can be the luma BV scaled by a factor, such as 2.

In an example, the chroma sample is a bottom right sample (1142) of the chroma unit (1111). Accordingly, the corresponding luma sample, e.g., (1152), is located in the bottom right luma unit (1124). Thus, the luma BV for the luma unit (1124) is used to determine the chroma BV. For example, the chroma BV can be the luma BV scaled by a factor, such as 2.

In an example, the chroma sample is a center sample (1143) of the chroma unit (1111). The center sample (1143) can correspond to one of luma samples (1143A)-(1143D), for example, depending on a specific location of the center sample (1143) in the chroma unit (1111). For example, when the center sample (1143) corresponds to the luma sample (1143A) in the luma unit (1121), the luma BV for the luma unit (1121) is used to determine the chroma BV. In another example, when the center sample (1143) corresponds to the luma sample (1143B) in the luma unit (1122), the luma BV for the luma unit (1122) is used to determine the chroma BV.

In an example, the chroma sample location or the chroma sample is pre-defined, such as a bottom left sample (1144), a top right sample (1145), or any other suitable location in the chroma unit (1111). Accordingly, the corresponding luma sample can be determined based on the chroma sample location. For example, a luma sample (1154) for the bottom left sample (1144) is located in the bottom left luma unit (1123). Thus, the luma BV for the luma unit (1123) is used to determine the chroma BV. The description can be adapted to another location, such as the top right sample (1145).

In an embodiment, the chroma BV for the chroma unit (1111) is determined based on an average of multiple luma BVs for some or all of the luma units (1121)-(1124). In an example, the luma BVs of the luma units (1121)-(1124) can be averaged with or without weights to obtain an averaged luma BV. The averaged luma BV can be scaled to determine the chroma BV. In an example, for the chroma unit (1111), the four luma units (1121)-(1124) are coded in the IBC mode so that the chroma BV can be determined for the chroma unit (1111).

Chroma BVs for the other chroma units (1112)-(1114) can be determined similarly as described with reference to FIG. 11B. Any suitable method described above or a combination of the above described methods can be used to determine the chroma BVs for the chroma units (1111)-(1114). For example, the chroma BV for the chroma unit (1111) can be determined based on the luma BV for the top left luma unit (1121), the chroma BV for the chroma unit (1112) can be determined based on a chroma BV for a top right luma unit (1126), the chroma BV for the chroma unit (1113) can be determined based on an average of the luma BVs for the luma units (1129)-(1132), and the chroma BV for the chroma unit (1114) can be determined based on a luma BV for a bottom left luma unit (1135).

Referring back to FIG. 11A, in an embodiment, for a chroma unit in the chroma CB (1110) to be coded in the IBC mode and have a chroma BV, at least one collocated luma unit of the chroma unit is coded in the IBC mode and has at least one luma BV. For example, for the chroma unit (1111) to be coded in the IBC mode and have the chroma BV, at least one of the collocated luma units (1121)-(1124) is coded in the IBC mode and has the at least one luma BV. In an example, the chroma unit can be coded in the IBC mode and have a chroma BV when one collocated luma unit of the chroma unit is coded in the IBC mode and has a luma BV. For example, when the luma unit (1121) is coded in the IBC mode and has a valid BV, the chroma unit (1111) can be coded in the IBC mode and the chroma BV for the chroma unit (1111) can be determined based on the luma BV of the luma unit (1121). One or more other collocated luma units (1122)-(1124) are not required to be coded in the IBC mode and have luma BVs. For example, the luma units (1122)-(1124) are not coded in the IBC mode and do not have luma BVs. In another example, the chroma unit can be coded in the IBC mode and have a chroma BV when all, or certain ones of, the collocated luma units of the chroma unit are coded in the IBC mode and have valid luma BVs. For example, when the luma units (1121)-(1124) are coded in the IBC mode and have the luma BVs, the chroma unit (1111) can be coded in the IBC mode. In the example, all the collocated luma units (1121)-(1124) are required to be coded in the IBC mode and have the luma BVs for the chroma unit (1111) to be coded in the IBC mode.

In an embodiment, for the chroma CB (1110) in FIG. 11A to be coded in the IBC mode, at least one of the collocated luma units for each chroma unit in the chroma CB (1110) is coded in the IBC mode and a chroma BV for each chroma unit can be derived from the at least one of the collocated luma units.

FIG. 11A shows an example where the chroma CB (1110) includes a plurality of chroma units. Alternatively, a chroma CB can be a single chroma unit where samples in the chroma CB are coded using a same chroma BV for the chroma CB. The chroma CB can be collocated with a plurality of luma units, and thus the chroma CB can be determined based on one or more of luma BVs for the plurality of luma units, similarly as described above with reference to FIGS. 11A-11B and when separate luma-chroma coding trees are enabled or disabled.

In general, sub-block based motion vector prediction modes and block based motion vector prediction modes can have different specifications for a luma unit size and a chroma unit size. Embodiments of the present disclosure include exemplary assignments for the luma unit size and the chroma unit size in the IBC mode that are based on a sub-block based motion vector prediction mode or a block based motion vector prediction mode. The exemplary assignments can be used separately or suitably combined with one or more embodiments described with reference to FIGS. 10 and 11A-11B, for example, to determine a chroma BV for a chroma unit.

In an embodiment, when separate luma and chroma coding trees are enabled, or are used, the luma unit size and the chroma unit size for the IBC mode can be set to be the same sizes as a luma unit and a chroma unit used for a sub-block based motion vector prediction mode. In one example, the sub-block based motion vector prediction mode is the affine motion compensation mode and the luma and chroma unit sizes in the affine motion compensation mode can be 4×4 luma samples and 4×4 chroma samples, respectively, and thus the luma and chroma unit sizes for the IBC mode are set to be 4×4 luma samples and 4×4 chroma samples, respectively.

In an embodiment, separate luma and chroma coding trees can either be applied or disabled. The luma unit size and the chroma unit size for the IBC mode can be set to be the same sizes as a luma unit and a chroma unit used for a sub-block based motion vector prediction mode, similarly as described above.

In an embodiment, when separate luma and chroma coding trees are disabled, or are not used for, for example, a slice, a picture, a tile, or other regions, the luma unit size and the chroma unit size for the IBC mode can be set to be the same sizes as a luma unit and a chroma unit used for a block based motion vector prediction mode. In one example, the luma and chroma unit sizes in the block based motion vector prediction mode can be 4×4 luma samples and 2×2 chroma samples, and thus the luma and chroma unit sizes for the IBC mode are set to be 4×4 luma samples and 2×2 chroma samples, respectively.

In an embodiment, separate luma and chroma coding trees can either be applied or disabled. The luma unit size and the chroma unit size for the IBC mode can be set to be the same sizes as a luma unit and a chroma unit used for a block based motion vector prediction mode, similarly as described above.

FIG. 12 shows a flow chart outlining a process (1200) according to an embodiment of the disclosure. The process (1200) can be used in the reconstruction of a chroma CB coded in the IBC mode. In various embodiments, the process (1200) are executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (1200) is implemented in software instructions, thus when the processing circuitry executes the software instructions, the processing circuitry performs the process (1200). The process starts at (S1201) and proceeds to (S1210).

At (S1210), prediction information of a chroma CB from a coded video bitstream can be decoded. The prediction information can indicate the IBC mode for the chroma CB and the chroma CB can include one or more chroma units. The chroma CB can be co-located with a luma region that include at least one luma unit. One of the one or more chroma units can be co-located with the at least one luma unit.

In an example, the IBC mode for the chroma CB can be signaled using a prediction mode flag. In one example, the IBC mode for the chroma CB can be inferred.

At (S1220), a chroma BV for the one of the one or more chroma units can be determined based on the at least one luma unit. The at least one luma unit can be coded in the IBC mode. In an example, the prediction information can indicate that the at least one luma unit can be coded in the IBC mode. The at least one luma unit can be previously decoded, and thus, one or more luma BVs for the at least one luma unit is available.

The chroma BV can be determined based on the one or more luma BVs. For example, when the at least one luma unit is a single luma unit, and thus the one of the one or more chroma units is collocated with the single luma unit, the chroma BV is determined based on a luma BV of the single luma unit, such as described with reference to FIG. 10. Alternatively, when the at least one luma unit includes a plurality of luma units, and thus the one of the one or more chroma units is collocated with the plurality of luma units, the chroma BV is determined based on one or more of luma BVs for the plurality of luma units, such as described with reference to FIGS. 11A-11B.

At (S1230), at least one sample in the one of the one or more chroma units can be reconstructed based on the chroma BV. The process (1200) proceeds to (S1299) and terminates.

The process (1200) can be performed when the separate luma-chroma coding trees are enabled or disabled.

Embodiments and examples described in the application can be used separately or combined in any order. Further, the methods, embodiments, and examples disclosed can be implemented by processing circuitry (e.g., one or more processors, ICs, circuits, or the like). In an example, the one or more processors execute a program that is stored in a non-transitory computer-readable medium. The term block may be interpreted as a CB or a CU.

The techniques described above, can be implemented as computer software using computer-readable instructions and physically stored in one or more computer-readable media. For example, FIG. 13 shows a computer system (1300) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 13:
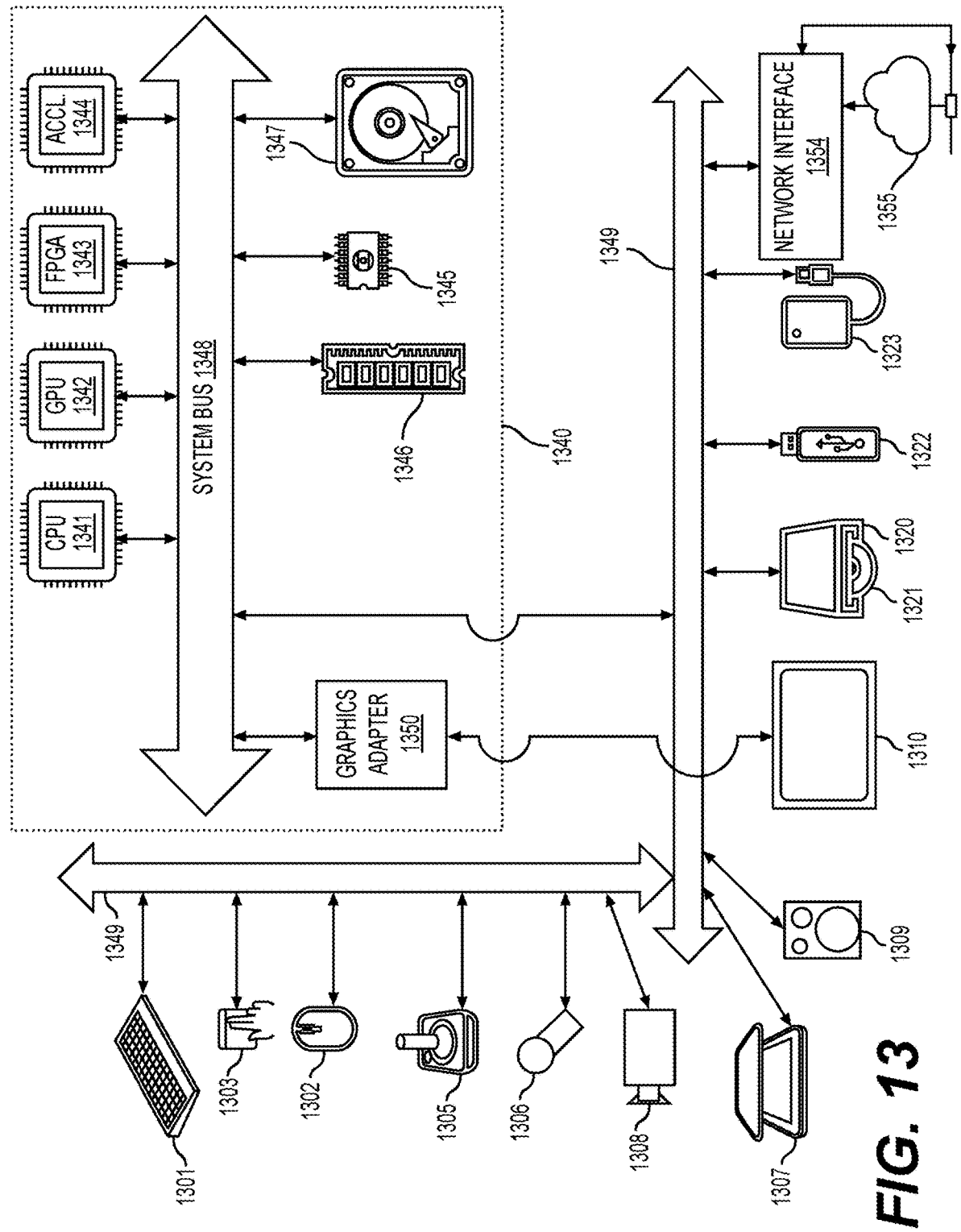
FIG. 13 is a schematic illustration of a computer system in accordance with an embodiment.

The components shown in FIG. 13 for computer system (1300) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1300).

Computer system (1300) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1301), mouse (1302), trackpad (1303), touch screen (1310), data-glove (not shown), joystick (1305), microphone (1306), scanner (1307), camera (1308).

Computer system (1300) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1310), data-glove (not shown), or joystick (1305), but there can also be tactile feedback devices that do not serve as input devices), audio output devices (such as: speakers (1309), headphones (not depicted)), visual output devices (such as screens (1310) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1300) can also include human accessible storage devices and their associated media such as optical media including CD/DVD ROM/RW (1320) with CD/DVD or the like media (1321), thumb-drive (1322), removable hard drive or solid state drive (1323), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1300) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1349) (such as, for example USB ports of the computer system (1300)); others are commonly integrated into the core of the computer system (1300) by attachment to a system bus as described below (for example Ethernet interface into a PC computer system or cellular network interface into a smartphone computer system). Using any of these networks, computer system (1300) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1340) of the computer system (1300).

The core (1340) can include one or more Central Processing Units (CPU) (1341), Graphics Processing Units (GPU) (1342), specialized programmable processing units in the form of Field Programmable Gate Areas (FPGA) (1343), hardware accelerators for certain tasks (1344), and so forth. These devices, along with Read-only memory (ROM) (1345), Random-access memory (1346), internal mass storage such as internal non-user accessible hard drives, SSDs, and the like (1347), may be connected through a system bus (1348). In some computer systems, the system bus (1348) can be accessible in the form of one or more physical plugs to enable extensions by additional CPUs, GPU, and the like. The peripheral devices can be attached either directly to the core's system bus (1348), or through a peripheral bus (1349). Architectures for a peripheral bus include PCI, USB, and the like.

CPUs (1341), GPUs (1342), FPGAs (1343), and accelerators (1344) can execute certain instructions that, in combination, can make up the aforementioned computer code. That computer code can be stored in ROM (1345) or RAM (1346). Transitional data can be also be stored in RAM (1346), whereas permanent data can be stored for example, in the internal mass storage (1347). Fast storage and retrieve to any of the memory devices can be enabled through the use of cache memory, that can be closely associated with one or more CPU (1341), GPU (1342), mass storage (1347), ROM (1345), RAM (1346), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1300), and specifically the core (1340) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1340) that are of non-transitory nature, such as core-internal mass storage (1347) or ROM (1345). The software implementing various embodiments of the present disclosure can be stored in such devices and executed by core (1340). A computer-readable medium can include one or more memory devices or chips, according to particular needs. The software can cause the core (1340) and specifically the processors therein (including CPU, GPU, FPGA, and the like) to execute particular processes or particular parts of particular processes described herein, including defining data structures stored in RAM (1346) and modifying such data structures according to the processes defined by the software. In addition or as an alternative, the computer system can provide functionality as a result of logic hardwired or otherwise embodied in a circuit (for example: accelerator (1344)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms
JEM: joint exploration model
VVC: versatile video coding
BMS: benchmark set MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gale Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof

What is claimed is:

1. A method for video encoding, comprising:
determining a single luma sample that has a location, relative to a shape formed by a combination of a plurality of luma units, based on a location of a center sample of a chroma unit of a chroma coding block (CB) to be coded in intra block copy (IBC) mode;
determining a chroma block vector (BV) of the chroma unit based on at least one luma unit of the plurality of luma units that is collocated with the chroma unit and corresponds to the determined single luma sample, the at least one collocated luma unit covering a same overlapping area as the chroma unit and being coded in the IBC mode; and
encoding at least one sample in the chroma unit based on the chroma BV.

2. The method of claim 1, wherein the at least one luma unit and the chroma CB are associated with separate luma-chroma coding trees.

3. The method of claim 1, further comprising:
setting a chroma unit size for the chroma unit and a luma unit size for the at least one luma unit based on sizes of a luma unit and a chroma unit used for one of: a sub-block based motion vector prediction mode and a block based motion vector prediction mode.

4. The method of claim 3, wherein
the at least one luma unit and the chroma CB are associated with separate luma-chroma coding trees; and
the setting the chroma unit size and the luma unit size includes setting the chroma unit size and the luma unit size based on the sizes of the luma unit and the chroma unit used for the sub-block based motion vector prediction mode.

5. The method of claim 3, wherein
separate luma-chroma coding trees are disabled; and
the setting the chroma unit size and the luma unit size includes setting the chroma unit size and the luma unit size based on the sizes of the luma unit and the chroma unit used for the block based motion vector prediction mode.

6. The method of claim 1, wherein
the chroma CB is collocated with a luma region;
each chroma unit in the chroma CB is collocated with one or more of the luma units in the luma region; and
for each of the chroma units in the chroma CB, the one or more luma units collocated with the respective chroma unit is coded in the IBC mode and is available to determine a chroma BV for the respective chroma unit.

7. An apparatus for video encoding, comprising:
processing circuitry configured to:
determine a single luma sample that has a location, relative to a shape formed by a combination of a plurality of luma units, based on a location of a center sample of a chroma unit of a chroma coding block (CB) to be coded in intra block copy (IBC) mode;
determine a chroma block vector (BV) of the chroma unit based on at least one luma unit of the plurality of luma units that is collocated with the chroma unit and corresponds to the determined single luma sample, the at least one collocated luma unit covering a same overlapping area as the chroma unit and being coded in the IBC mode; and
encode at least one sample in the chroma unit based on the chroma BV.

8. The apparatus of claim 7, wherein the at least one luma unit and the chroma CB are associated with separate luma-chroma coding trees.

9. The apparatus of claim 7, wherein the processing circuitry is configured to:
set a chroma unit size for the chroma unit and a luma unit size for the at least one luma unit based on sizes of a luma unit and a chroma unit used for one of: a sub-block based motion vector prediction mode and a block based motion vector prediction mode.

10. The apparatus of claim 9, wherein:
the at least one luma unit and the chroma CB are associated with separate luma-chroma coding trees; and
the processing circuitry is configured to set the chroma unit size and the luma unit size based on the sizes of the luma unit and the chroma unit used for the sub-block based motion vector prediction mode.

11. The apparatus of claim 9, wherein
the chroma CB is collocated with a luma region;
each chroma unit in the chroma CB is collocated with one or more of the luma units in the luma region; and
for each of the chroma units in the chroma CB, the one or more luma units collocated with the respective chroma unit is coded in the IBC mode and is available to determine a chroma BV for the respective chroma unit.

12. A non-transitory computer-readable storage medium storing a program executable by at least one processor to perform:

determining a single luma sample that has a location, relative to a shape formed by a combination of a plurality of luma units, based on a location of a center sample of a chroma unit of a chroma coding block (CB) to be coded in intra block copy (IBC) mode;

determining a chroma block vector (BV) of the chroma unit based on at least one luma unit of the plurality of luma units that is collocated with the chroma unit and corresponds to the determined single luma sample, the at least one collocated luma unit covering a same overlapping area as the chroma unit and being coded in the IBC mode; and encoding at least one sample in the chroma unit based on the chroma BV.

13. The non-transitory computer-readable storage medium of claim 12, wherein the at least one luma unit and the chroma CB are associated with separate luma-chroma coding trees.

14. The non-transitory computer-readable storage medium of claim 12, wherein the program is further executable by the at least one processor to perform:

setting a chroma unit size for the chroma unit and a luma unit size for the luma unit based on sizes of a luma unit and a chroma unit used for one of: a sub-block based motion vector prediction mode and a block based motion vector prediction mode.

15. The non-transitory computer-readable storage medium of claim 14, wherein the at least one luma unit and the chroma CB are associated with separate luma-chroma coding trees; and the setting the chroma unit size and the luma unit size includes setting the chroma unit size and the luma unit size based on the sizes of the luma unit and the chroma unit used for the sub-block based motion vector prediction mode.

16. The non-transitory computer-readable storage medium of claim 14, wherein separate luma-chroma coding trees are disabled; and the setting the chroma unit size and the luma unit size includes setting the chroma unit size and the luma unit size based on the sizes of the luma unit and the chroma unit used for the block based motion vector prediction mode.

17. The non-transitory computer-readable storage medium of claim 12, wherein the chroma CB is collocated with a luma region;

each chroma unit in the chroma CB is collocated with one or more of the luma units in the luma region; and for each of the chroma units in the chroma CB, the one or more luma units collocated with the respective chroma unit is coded in the IBC mode and is available to determine a chroma BV for the respective chroma unit.

* * * * *